May 31, 1949.    J. E. HASTINGS    2,471,684
MACHINIST'S GAUGE
Filed Sept. 30, 1946
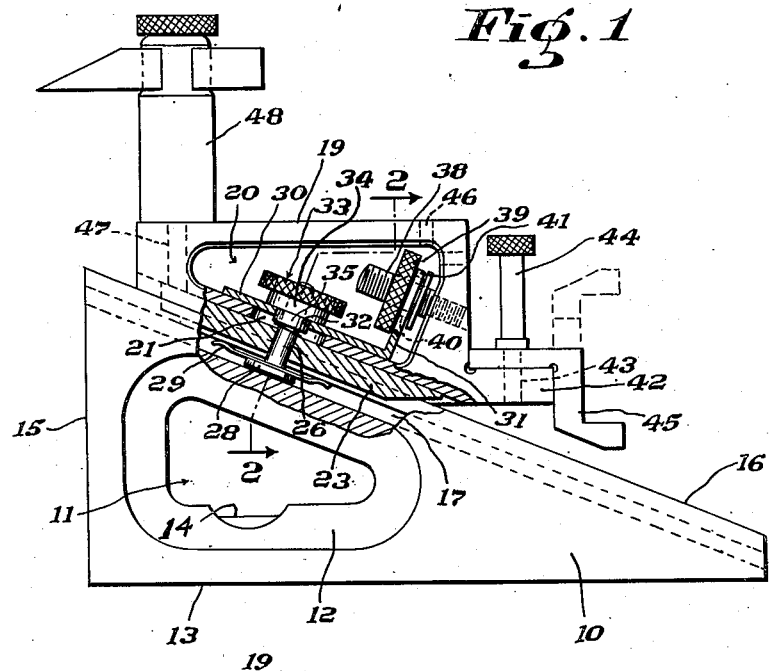
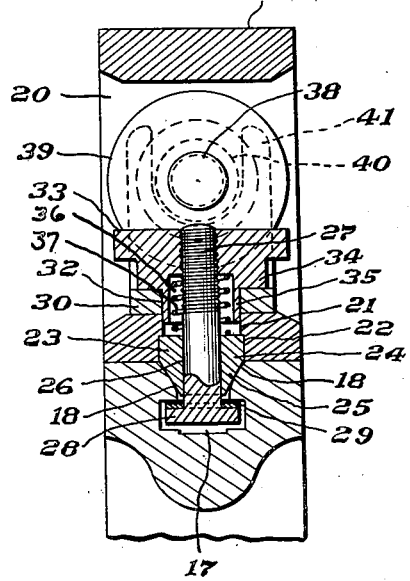
INVENTOR.
JAMES E. HASTINGS
BY
Geo B Rawlings
ATTORNEY Patented May 31, 1949

2,471,684

UNITED STATES PATENT OFFICE 2,471,684

MACHINIST'S GAUGE

James E. Hastings, Athol, Mass., assignor to The L. S. Starrett Company, Athol, Mass., a corporation of Massachusetts Application September 30, 1946, Serial No. 700,305

2 Claims. (Cl. 33—162)

1

My present invention relates to gauges for the precision measurements of heights on work to be machined on planers, shapers, milling machines, and the like, and is an improvement upon the machinist's gauge disclosed in the patent to Koning, 2,397,492, dated April 2, 1946.

An object of my invention is an improved gauge for measuring and determining accurately various heights on a piece of work held in position on a planer, shaper, milling machine, or other machine tool.

Another object is an improved gauge whereby an approximate setting of the measuring instrument may be rapidly made, followed subsequently by an accurate final setting of such instrument.

Other objects and novel features of the construction and arrangement of parts comprising the device will appear as the description of the invention progresses.

In the accompanying drawing:

Fig. 1 is a side elevation, partly in section, of preferred embodiment of my invention, and Fig. 2 is a sectional elevation, taken on the line 2—2 of Fig. 1, and looking in the direction of the arrows.

Referring to the drawing, 10 designates a right-triangular frame or block having a triangular opening 11 therethrough, bounded by a web 12, substantially semi-circular in cross-section. Mounted in the portion of the web parallel to the base 13 is a spirit level 14 for indicating the true horizontal position of the base 13 and the true vertical position of the leg or side 15 of the frame 10.

The hypotenuse or inclined face 16 of the frame 10 has a T-slot extending substantially from end to end. The vertical portion of the T-slot 17, and on each side thereof, is slightly rounded convexly in cross-section as indicated at 18 (Fig. 2).

Slidably mounted on the inclined face or hypotenuse 16 of block 10 is a triangular gauge head or slide 19 having an opening 20 therethrough. Connecting with opening 20 is an elongated hole or slot 21 which extends through the inclined face of the slide 19. Formed in the inclined face of slide 19 is a longitudinal groove 22 of a width substantially equal to the width of the T-slot 17.

Mounted for sliding movement in the groove 22 is a key 23. This key 23 has a parallel sided portion 24 slidably fitting into the groove 22, and a wedge shaped portion 25 fitting into the T-slot 17 and bearing on the rounded sides 18 thereof.

2

At the desired point along the length of the key 23 is a hole 26 through which extends the body portion of a threaded bolt 27, this bolt being provided with the non-circular head 28 which fits into and is slidable along the length of the T-slot 17. Fitting onto the bolt 27 adjacent the non-circular head 28 and between such head and the under side of key 23 is a flat compression or blade spring 29. The bolt 27 extends upwardly through the key 23 and elongated slot or hole 21 in the inclined face of the slide or gauge head 19. Within the confines of the opening 20 and slidably mounted on the lower inclined face of the slide or gauge head 19 is a plate 30. One end of such plate is upturned at substantially right angles, and in the plate 30 is a hole 32.

Screwing onto the threaded bolt 27 is a thumb nut 33 provided with a reduced portion 34 in engagement with the plate 30, and with a further reduced portion 35 rotatably mounted in the hole 32 in plate 30. The reduced portion 35 is of a diameter to rotate freely in the hole 32 and is of a length greater than the thickness of the plate 30 to permit it to extend slightly into the elongated slot 21. The under side of the thumb nut 33 is recessed at 36 to receive the coil spring 37 which bears against the base 24 of the key 23.

In a side of the gauge head 19 is a screw 38, on which is mounted a knurled nut 39, provided with an annular groove 40. In the upturned end 31 of the plate 39 is formed a fork 41 which fits into the groove 40.

Offset from the lower end of the gauge head 19 is a projection 42 arranged parallel to the upper surface of the gauge head and this projection 42 is drilled and tapped at 43 to receive the threaded end of a holding member 44. Positioned on the upper surface of the projection 42 is a device or foot 45, adapted to be placed as shown in full lines, or as shown in dash lines.

Drilled and tapped holes 46 and 47 are also provided in the upper surface of the gauge head 19 to receive various forms of measuring or marking instruments, as the marking instrument 48 shown in Fig. 1.

In operation, the gauge head 19 is moved along the inclined surface 16 of the block 10 to bring the measuring instrument, as the marking instrument 48, into approximately the desired position with regard to the work being operated upon. The thumb nut 33 is now operated to set the compression spring 29 against the under face of the T-slot 17 with sufficient pressure to prevent accidental displacement of the gauge head during subsequent operations. The construction is such that the key 23, bolt 27, plate 30 and knurled nut 33 act as a unit and are fixed, under these conditions, to the block 10. Rotation of the knurled nut 39 on screw 38 will therefore cause a limited movement of the gauge head 19 along the inclined surface 16 of the block 10, the direction of movement being determined by the direction of rotation of said nut. The gauge head slides on the parallel sided portion 24 of the key 23. By this means the proper setting of the instrument 45 and/or the instrument 48 may be accurately determined. When determined, the knurled nut 33 may be further operated to securely lock the gauge head 19 firmly to the block 10.

The curved or rounded sides 18 of the T-slot 17 in conjunction with the wedge shaped portion 25 of the key 23 aid materially in effecting a solid holding contact between the said key and block 10, and a contact relation which is easily and effectively controlled. Such construction also reduces wear to a minimum, and results in a smooth acting tool in which side play is reduced to the minimum.

Having thus described my invention, what I claim as new is:

1. A gauge, comprising a base the upper face of which is formed to present an inclined slideway having a T-slot extending substantially from end to end thereof, the side walls of the leg portion of said T-slot being inclined upwardly and outwardly with respect to the head portion of said T-slot and having convexly rounded surfaces, a superposed gauge head slidable along said slideway and having on its under face a longitudinal groove with parallel side walls registering with said T-slot, a key having side walls which at their upper ends are parallel and closely fit the parallel side walls of said groove and below said parallel sides are inclined downwardly and inwardly for line contact with the convexly rounded surfaces of the upwardly and outwardly inclined side walls of the head portion of said T-slot, and means for clamping said gauge head in adjusted positions along said slideway.

2. The gauge of claim 1 wherein the means for clamping said gauge head in adjusted positions along said slideway includes a bolt extending through the gauge head and the key and threaded at its upper end and provided at its lower end with a non-circular portion fitting in the head portion of the T-slot, a blade spring between said non-circular portion of said bolt and the under face of said key, a thumb nut threaded to the threaded portion of said bolt and having a recess in its under face, and a spring located in said recess and coiled about the threaded portion of said bolt and reactive between the upper face of said key and the wall of the recess opposite thereto.

JAMES E. HASTINGS.

REFERENCES CITED

The following references are of record in the file of this patent:

UNITED STATES PATENTS

| Number | Name | Date |
|---|---|---|
| 1,040,774 | Schamel | Oct. 8, 1912 |
| 2,242,116 | Donaway | May 13, 1941 |
| 2,353,386 | Findley et al. | July 18, 1944 |
| 2,372,368 | Dierking | Mar. 27, 1945 |
| 2,397,492 | Koning | Apr. 2, 1946 |